United States Patent
Krapfl

(10) Patent No.: US 11,390,147 B2
(45) Date of Patent: Jul. 19, 2022

(54) CONVERTIBLE VEHICLE DOORS

(71) Applicant: Clifford Krapfl, Chicago, IL (US)

(72) Inventor: Clifford Krapfl, Chicago, IL (US)

(73) Assignee: FCA US LLC, Auburn Hills, MI (US)

(*) Notice: Subject to any disclaimer, the term of this patent is extended or adjusted under 35 U.S.C. 154(b) by 0 days.

(21) Appl. No.: 17/068,946

(22) Filed: Oct. 13, 2020

(65) Prior Publication Data

US 2022/0111710 A1 Apr. 14, 2022

(51) Int. Cl.
*B60J 5/04* (2006.01)

(52) U.S. Cl.
CPC .......... *B60J 5/0476* (2013.01); *B60J 5/0416* (2013.01)

(58) Field of Classification Search
CPC ...... B60J 5/0476; B60J 5/0486; B60J 5/0487; B60J 5/0416
USPC ................................................ 296/147, 148
See application file for complete search history.

(56) References Cited

U.S. PATENT DOCUMENTS

| | | | |
|---|---|---|---|
| 4,644,699 A | 2/1987 | Chandler et al. | |
| 4,943,109 A * | 7/1990 | Skrbina | B60J 5/0405 |
| | | | 174/72 A |
| 5,867,942 A | 2/1999 | Kowalski | |
| 6,036,255 A | 3/2000 | Lester et al. | |
| 6,101,765 A | 8/2000 | Hashimoto et al. | |
| 6,343,832 B1 * | 2/2002 | Queener | B60J 5/0425 |
| | | | 296/146.6 |
| 6,886,881 B1 | 5/2005 | Henderson et al. | |
| 8,556,330 B2 | 10/2013 | Lazarevich et al. | |
| 10,272,747 B2 | 4/2019 | Nania | |
| 10,300,772 B1 * | 5/2019 | Marsack | E05B 79/20 |
| 10,363,798 B2 | 7/2019 | Kleinhoffer | |
| 10,562,380 B2 * | 2/2020 | Marchetti | B60J 5/0487 |
| 2004/0061356 A1 * | 4/2004 | Martini | B60J 5/0487 |
| | | | 296/153 |
| 2005/0110298 A1 | 5/2005 | Fin et al. | |
| 2006/0181102 A1 | 8/2006 | Lemieux | |
| 2019/0061490 A1 * | 2/2019 | Getzschman | B60J 5/0487 |
| 2019/0128030 A1 * | 5/2019 | Bacon | E06B 9/52 |
| 2019/0232765 A1 * | 8/2019 | Hoffman | B60J 5/0487 |
| 2019/0232766 A1 | 8/2019 | Patel et al. | |
| 2019/0256037 A1 * | 8/2019 | Ghannam | B60R 21/21 |
| 2020/0180407 A1 * | 6/2020 | Whipps | B60N 3/02 |

FOREIGN PATENT DOCUMENTS

| | | | | |
|---|---|---|---|---|
| EP | 0336636 A2 * | 10/1989 | ............ | B60J 5/0416 |
| WO | WO-2020033619 A1 * | 2/2020 | ............ | B60J 5/0487 |

* cited by examiner

*Primary Examiner* — Jason S Morrow
*Assistant Examiner* — Wenwei Zhuo
(74) *Attorney, Agent, or Firm* — Ralph E. Smith

(57) ABSTRACT

A convertible vehicle door includes a high visibility exterior off-road frame door including a hinge assembly to hingedly couple to a vehicle body, and an inner on-road panel configured to releasably couple to the high visibility exterior off-road frame door inboard thereof. The convertible vehicle door is convertible between an on-road door configuration where the inner on-road panel is coupled to the high visibility exterior off-road frame door, and an off-road door configuration where the inner on-road panel is detached from the high visibility exterior off-road frame door.

13 Claims, 2 Drawing Sheets

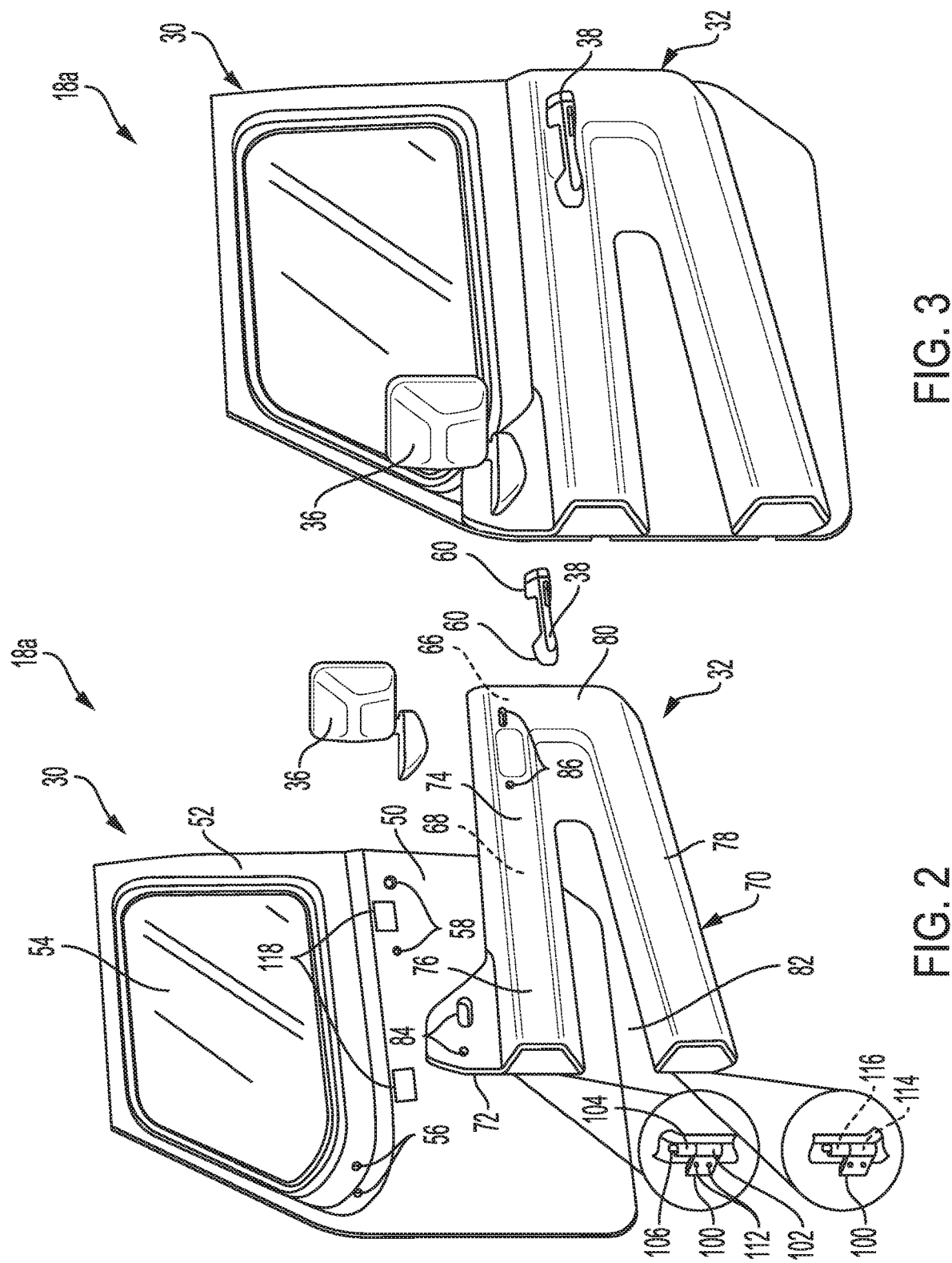

CONVERTIBLE VEHICLE DOORS

FIELD

The present application relates generally to vehicle door systems and, more particularly, to removable door systems convertible between on-road and off-road driving configurations.

BACKGROUND

It is known in the motor vehicle art to provide a convertible top, which may be folded back or removed from the vehicle to provide a user the benefit of open air driving while affording available protection in the event of adverse weather conditions. Such vehicles typically include a set of highway use doors. In order to further improve open air driving and provide increased off-road visibility, some users also acquire a second set of specially designed off-road doors. However, switching between the two sets of doors can potentially be complex and time consuming. Therefore, while such systems do work well for their intended purpose, it is desirable to provide continuous improvement in the relevant art.

SUMMARY

In accordance with one example aspect of the invention, a convertible vehicle door is provided. In one example implementation, the convertible vehicle door includes a high visibility exterior off-road frame door including a hinge assembly to hingedly couple to a vehicle body, and an inner on-road panel configured to releasably couple to the high visibility exterior off-road frame door inboard thereof. The convertible vehicle door is convertible between an on-road door configuration where the inner on-road panel is coupled to the high visibility exterior off-road frame door, and an off-road door configuration where the inner on-road panel is detached from the high visibility exterior off-road frame door.

In addition to the foregoing, the described convertible vehicle door may include one or more of the following features: wherein the high visibility exterior off-road frame door includes an upper frame member coupled to a lower frame member by a connecting frame member; wherein the upper frame member, the lower frame member, and the connecting frame member define a window therein to enable visibility therethrough; wherein the upper frame member extends substantially horizontally, the connecting frame member extends substantially vertically, and the lower frame member extends downwardly at an angle relative to the upper frame member; wherein the high visibility exterior off-road frame door is fabricated from a stamped metal; and a side view mirror coupled to a mirror support flange of the high visibility exterior off-road frame door.

In addition to the foregoing, the described convertible vehicle door may include one or more of the following features: wherein hinge assembly comprises a leaf having a first knuckle hingedly coupled to a second knuckle by an off-road door pin, wherein the leaf is configured to couple to the vehicle body, and wherein the second knuckle is coupled to the high visibility exterior off-road frame door; wherein the inner on-road panel comprises a door structure, a window frame, and a window; wherein the inner on-road panel houses a window lift mechanism configured to raise and lower the window; wherein electronics are housed within the high visibility exterior off-road frame door; and wherein the electronics include a power window control system and a power side view mirror control system.

In accordance with another example aspect of the invention, a vehicle is provided. In one example implementation, the vehicle includes a body and a driver door and a passenger door at least partially defining a passenger compartment. The driver door and the passenger door are each convertible vehicle doors including a high visibility exterior off-road frame door including a hinge assembly to hingedly couple to the vehicle body, and an inner on-road panel configured to releasably couple to the high visibility exterior off-road frame door inboard thereof. The convertible vehicle door is convertible between an on-road door configuration where the inner on-road panel is coupled to the high visibility exterior off-road frame door, and an off-road door configuration where the inner on-road panel is detached from the high visibility exterior off-road frame door.

In addition to the foregoing, the described vehicle may include one or more of the following features: wherein the convertible vehicle doors further include a side view mirror coupled to a mirror support flange of the high visibility exterior off-road frame door, and a door handle coupled to a latch system housed in the high visibility exterior off-road frame door; and a pair of rear convertible vehicle doors each including a rear high visibility exterior off-road frame door including a rear hinge assembly to hingedly couple to the vehicle body, and a rear inner on-road panel configured to releasably couple to the rear high visibility exterior off-road frame door inboard thereof, wherein the rear convertible vehicle door is convertible between a rear on-road door configuration where the rear inner on-road panel is coupled to the rear high visibility exterior off-road frame door, and a rear off-road door configuration where the rear inner on-road panel is detached from the rear high visibility exterior off-road frame door.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is an exploded view of one of the example convertible vehicle doors shown in FIG. 1, in accordance with the principles of the present application; and FIG. 3 is a perspective view of the convertible vehicle door shown in FIG. 2 in an on-road configuration, in accordance with the principles of the present application.

DESCRIPTION

Figure 1:
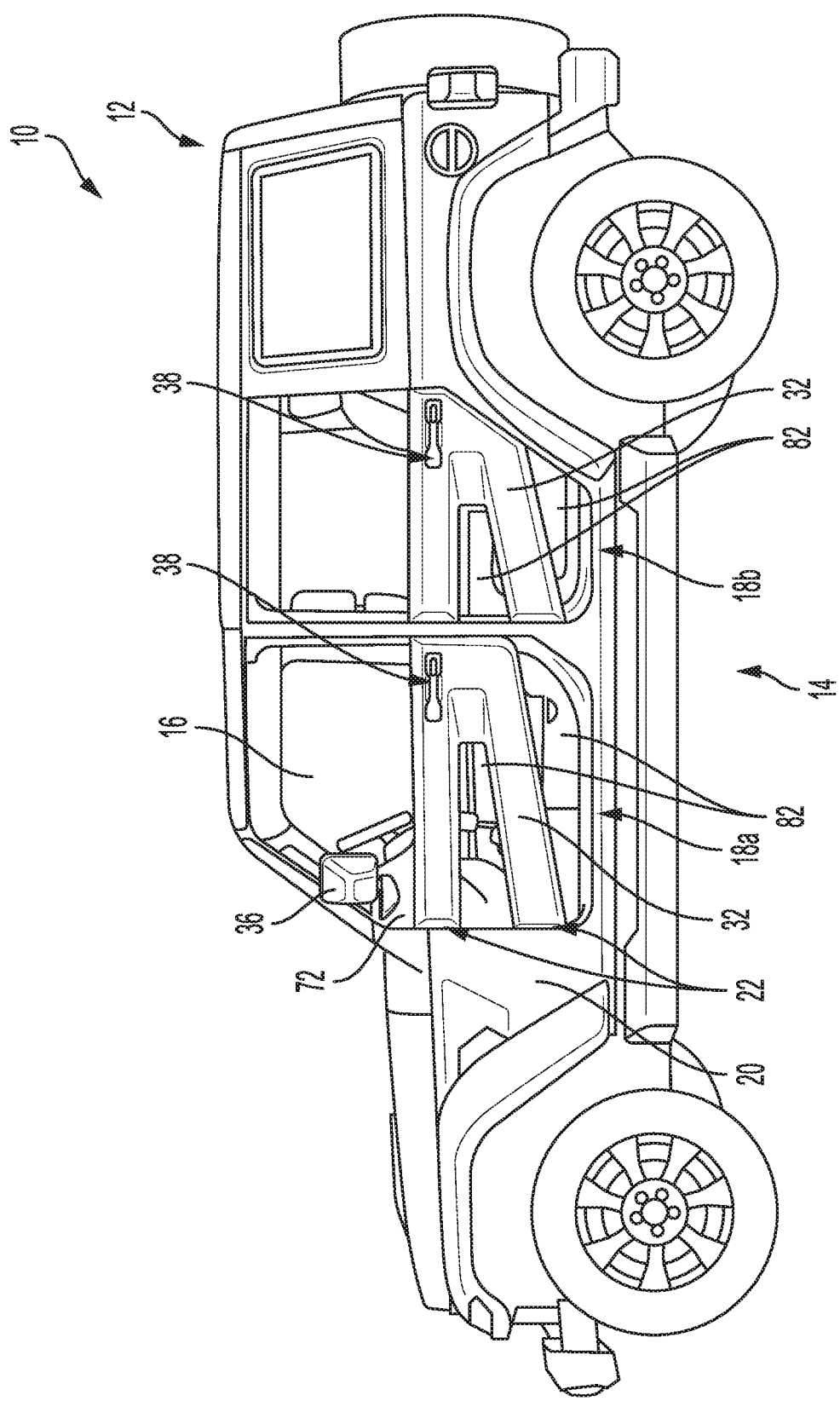
FIG. 1 is a side view of an example vehicle with convertible doors in an off-road configuration, in accordance with the principles of the present application.

According to the principles of the present application, systems and methods are described for convertible vehicle doors configured to convert between an on-road door configuration and an off-road door configuration. In example embodiments, the convertible vehicle doors include a high visibility exterior frame off-road door disposed outboard of an inner on-road panel. When the on-road door configuration is desired, the inner on-road panel is attached to the off-road door. When the off-road configuration is desired, the inner on-road panel is detached from the off-road door.

With initial reference to FIG. 1, a vehicle 10 having a convertible top system 12 and a convertible door system 14 in accordance with the principles of the present disclosure is illustrated. As shown, the convertible top system 12 and the convertible door system 14 at least partially enclose and define a passenger compartment 16 in which the vehicle driver and passengers sit during operation of the vehicle. In the example embodiment, the convertible top system 12 is a hard top system, however, it will be appreciated that convertible top system 12 may be a soft top or other system. In the example implementation, the convertible door system 14 includes selectively removable, convertible doors 18 removably coupled to a body 20 of the vehicle by one or more door hinge assemblies 22. As described herein in more detail, each convertible door 18 is transformable between an off-road configuration (FIG. 1) and an on-road configuration (FIG. 3). Further, each convertible door 18 is removably coupled to the body 20 to enable users to remove the doors entirely from the vehicle 10.

With reference now to FIGS. 1-3, the transformable doors 18 will be described in more detail. As shown in FIG. 1, vehicle 10 includes a pair of removable front doors 18a and a pair of removable rear doors 18b. It will be appreciated, however, that vehicle 10 can have any suitable number of doors, some or all of which are transformable between the on-road configuration and the off-road configuration. Further, for ease of discussion, only the front driver side door will be described in detail, but it will be appreciated that any or all of convertible doors 18 can be structurally and functionally identical or substantially similar thereto.

As shown in FIG. 2, in the example embodiment, convertible front door 18a generally includes an inner on-road panel 30 and a high visibility off-road exterior frame door 32. Advantageously, the inner on-road panel 30 is removably coupled to the exterior off-road door 32. In the on-road configuration of door 18a, the exterior off-road door 32 is disposed outboard of the inner on-road panel 30. However, the inner on-road panel 30 can be subsequently uncoupled from the exterior off-road door 32, thereby providing an open air, off-road door configuration for the vehicle 10, as shown in FIG. 1.

In the example implementation, the inner on-road panel 30 includes side windows (FIG. 2) and associated window lift mechanisms/motors, while the exterior off-road door 32 houses the vehicle door electronics such as, for example, power lock controls, window controls, power side view mirror controls, lighting, and the like. Additionally, in the example implementation, front doors 18a include a removable side view mirror 36, while all doors 18 include a door handle 38.

In the example embodiments, the inner on-road panel 30 generally includes a door structure 50 (e.g., door sheet metal), a window frame 52, a window 54, and a portion of hinge assembly 22. The door structure 50 includes one or more apertures 56 configured to receive fasteners (not shown) for coupling the side view mirror 36 to the inner on-road panel 30. However, it will be appreciated that side view mirror 36 may be coupled to the inner on-road panel 30 by a suitable means that enables door 18a to function as described herein. As shown in FIG. 2, the door structure 50 includes one or more apertures 58 configured to receive one or more posts 60 of the door handle 38 to thereby secure the door handle 38 to the door structure 50 when inner on-road panel 30 is utilized.

In the example embodiments, the exterior off-road door 32 generally includes an exterior frame 70, a mirror support flange 72, a door handle support surface 74, and another portion of hinge assembly 22. In the illustrated example, the exterior frame 70 includes an upper bar or frame member 76 and a lower bar or frame member 78 connected by a connecting bar or frame member 80. In the example implementation, upper frame member 76 extends horizontally or substantially horizontally, connecting frame member 80 extends vertically or substantially vertically, and lower frame member 78 extends at an angle downwardly toward the ground as it extends from the connecting frame member 80 such that exterior frame 70 has a generally triangular configuration. However, it will be appreciated that exterior frame 70 may have various other arrangements.

In the example embodiment, exterior frame 70 is a single piece component fabricated from stamped metal, however, it will be appreciated that exterior frame 70 may be fabricated by other materials/methods (e.g., hydroforming, polymer structure, etc.) and may be formed by coupling two or more separate components. As shown in FIG. 1, in this arrangement, the exterior frame 70 defines spaces or windows 82 therein (or between frame 70 and vehicle body 20), thus providing improved visibility and airflow therethrough, for example, during off-road driving.

As shown in FIG. 2, the mirror support flange 72 includes one or more apertures 84 configured to selectively align with apertures 56 and receive fasteners (not shown) for coupling the side view mirror 36 to the exterior off-road door 32, as well as receive electrical connections for electrical systems of the side view mirror 36. In this way, side view mirror 36 can be removably coupled to the inner on-road panel 30 and the exterior off-road door 32. However, it will be appreciated that side view mirror 36 may be coupled to the exterior off-road door 32 by a suitable means that enables door 18a to function as described herein.

In the example embodiment, the upper frame member 76 supports and at least partially houses the door handle 38 and an associated latch system 66, such as a conventional door latch system and striker, though they may be located in any desirable area of the off-road door 32. In the example implementation shown in FIG. 2, the upper frame member 76 includes door handle support surface 74 having one or more apertures 86 to selectively align with apertures 58 to receive posts 60 of the door handle 38. Once attached, door handle 38 is configured to operably couple to the latch system 66, including a release mechanism. Additionally, the upper frame member 76 houses electronics 68, such as power lock and power mirror controls or systems, although they may be located in any desirable area of the off-road door 32.

Turning now to FIG. 2, the door hinge assemblies 22 will be described in more detail. In one example embodiment, the door hinge assemblies 22 allow the convertible doors 18 to pivot between a closed position and an open position to allow a user of the vehicle 10 to enter and exit the passenger compartment 16. Further, the door hinge assemblies 22 are configured to enable a user to quickly and easily remove one or more portions of the convertible door 18 from the body 20 of the vehicle 10 using only simple tools such as a wrench, screwdriver, hex key, or other tool that may be conveniently stored within the vehicle 10. In this way, the user may remove entirely one or more doors 18 from the body 20 of the vehicle 10.

As shown in FIG. 2, in the example implementation, each hinge assembly 22 is comprised of a leaf 100 having a first knuckle 102, a second or off-road door knuckle 104, a first or off-road door pin 106. The leaf 100 includes a plurality of apertures 112 configured to receive fasteners (not shown) for coupling the leaf 100 to the vehicle body 20. Alternatively, leaf 100 may be attached to body 20 by any suitable means such as, for example, via welding. The first knuckle 102 is coupled to or integrally formed with the leaf 100 and is a tubular, substantially cylindrical member defining a receiving aperture 114 extending therethrough.

The second knuckle 104 is coupled to or integrally formed with the exterior off-road door 32 and is also a tubular, substantially cylindrical member defining a receiving aperture 116 extending therethrough. As shown in FIG. 2, the first and second knuckles 102, 104 are configured to be aligned such that the off-road door pin 106 can be inserted through receiving apertures 114, 116. A retaining member (e.g., a nut, not shown) may then be coupled to a bottom end of the off-road door pin 106 to hingedly secure the exterior off-road door 32 to the vehicle body 20.

As shown in FIG. 3, the inner on-road panel 30 is configured for removable coupling to the exterior off-road door 32 via attachments 118 (shown schematically) such as, for example, fasteners, latches, hooks, or the like to facilitate preventing the two from swinging apart during travel. In this way, the inner on-road panel 30 and exterior off-road door 32 are hingedly coupled to the vehicle body 20 as a unitary component via the hinge assemblies 22. The convertible door 18 can then be quickly converted to only the exterior off-road door 32 by simply de-coupling the inner on-road panel 30 from the exterior off-road door 32 via attachments 118.

In one example operation, the convertible door 18a begins in the on-road configuration shown in FIG. 3. In order to convert door 18a to the off-road configuration, the inner on-road panel 30 is detached from the exterior off-road door 32 by separating from the attachments 118. The convertible door 18a is then in the off-road configuration. The steps can then be reversed to convert the door 18a back into the on-road configuration.

Described herein are systems and methods for a convertible vehicle door configured to be converted between an on-road configuration and an off-road configuration. The system includes an off-road frame door disposed outboard of an on-road panel, which is selectively detachable from the off-road frame door. When the on-road configuration is desired, the on-road panel and the interior door panel are reattached to the off-road door to form a single unit hingedly coupled to the vehicle body. When the off-road configuration is desired, the inner on-road panel is detached, leaving only the off-road door hingedly coupled to the vehicle body. The off-road frame doors provide better visibility when off-roading and are advantageously integrated into the vehicle's design, thereby obviating the need for a separate set of off-roading doors. As such, the transformable doors allow for user selection between on-road and off-road configurations, which reduces complexity and changing time associated with separate on-road and off-road vehicle doors.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A convertible vehicle door comprising:
a high visibility exterior off-road frame door including:
a hinge assembly to hingedly couple to a vehicle body;
an upper frame member; and
a lower frame member coupled to the upper frame member by a connecting frame member; and
an inner on-road panel configured to releasably couple to the high visibility exterior off-road frame door inboard thereof,
wherein the upper frame member, the lower frame member, and the connecting frame member define a window in the high visibility exterior off-road frame door to enable visibility therethrough,
wherein the convertible vehicle door is convertible between an on-road door configuration where the inner on-road panel is coupled to the high visibility exterior off-road frame door, and an off-road door configuration where the inner on-road panel is detached from the high visibility exterior off-road frame door.

2. The convertible vehicle door of claim 1, wherein the upper frame member extends substantially horizontally, the connecting frame member extends substantially vertically, and the lower frame member extends downwardly at an angle relative to the upper frame member.

3. The convertible vehicle door of claim 1, wherein the high visibility exterior off-road frame door is fabricated from a stamped metal.

4. The convertible vehicle door of claim 1, further comprising a side view mirror coupled to a mirror support flange of the high visibility exterior off-road frame door.

5. The convertible vehicle door of claim 1, wherein the hinge assembly comprises a leaf having a first knuckle hingedly coupled to a second knuckle by an off-road door pin,
wherein the leaf is configured to couple to the vehicle body, and
wherein the second knuckle is coupled to the high visibility exterior off-road frame door.

6. The convertible vehicle door of claim 1, wherein the inner on-road panel comprises a door structure, a window frame, and a window; and
wherein the high visibility exterior off-road frame door is visible from the exterior of the vehicle body when in the on-road door configuration where the inner on-road panel is coupled to the high visibility exterior off-road frame door.

7. The convertible vehicle door of claim 6, wherein the inner on-road panel houses a window lift mechanism configured to raise and lower the window.

8. The convertible vehicle door of claim 1, wherein electronics are housed within the high visibility exterior off-road frame door.

9. The convertible vehicle door of claim 8, wherein the electronics include a power window control system and a power side view mirror control system.

10. A vehicle comprising:
a body; and
a driver door and a passenger door at least partially defining a passenger compartment, wherein the driver door and the passenger door are each convertible vehicle doors comprising:
   a high visibility exterior off-road frame door including a hinge assembly to hingedly couple to the vehicle body and an upper frame member coupled to a lower frame member by a connecting frame member; and
   an inner on-road panel configured to releasably couple to the high visibility exterior off-road frame door inboard thereof,
   wherein the upper frame member, the lower frame member, and the connecting frame member define a window in the high visibility exterior off-road frame door to enable visibility therethrough,
   wherein the convertible vehicle door is convertible between an on-road door configuration where the inner on-road panel is coupled to the high visibility exterior off-road frame door, and an off-road door configuration where the inner on-road panel is detached from the high visibility exterior off-road frame door.

11. The vehicle of claim 10, wherein the upper frame member extends substantially horizontally, the connecting frame member extends substantially vertically, and the lower frame member extends downwardly at an angle relative to the upper frame member.

12. The vehicle of claim 10, wherein the convertible vehicle doors further comprise:
   a side view mirror coupled to a mirror support flange of the high visibility exterior off-road frame door; and
   a door handle coupled to a latch system housed in the high visibility exterior off-road frame door.

13. The vehicle of claim 10, further comprising a pair of rear convertible vehicle doors each comprising:
   a rear high visibility exterior off-road frame door including a rear hinge assembly to hingedly couple to the vehicle body; and
   a rear inner on-road panel configured to releasably couple to the rear high visibility exterior off-road frame door inboard thereof,
   wherein the rear convertible vehicle door is convertible between a rear on-road door configuration where the rear inner on-road panel is coupled to the rear high visibility exterior off-road frame door, and a rear off-road door configuration where the rear inner on-road panel is detached from the rear high visibility exterior off-road frame door.

* * * * *